(12) United States Patent
Carlson et al.

(10) Patent No.: US 8,603,571 B2
(45) Date of Patent: Dec. 10, 2013

(54) CONSUMABLE TOOL FRICTION STIR PROCESSING OF METAL SURFACES

(75) Inventors: Blair E. Carlson, Ann Arbor, MI (US); Guangling Song, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 165 days.

(21) Appl. No.: 13/113,171

(22) Filed: May 23, 2011

(65) Prior Publication Data

US 2012/0301603 A1 Nov. 29, 2012

(51) Int. Cl.
  *C23C 26/00* (2006.01)
(52) U.S. Cl.
  USPC .......................................................... 427/11
(58) Field of Classification Search
  USPC .......................................................... 427/11
  See application file for complete search history.

(56) References Cited

U.S. PATENT DOCUMENTS

2002/0193217 A1* 12/2002 Yoshinaga ..................... 483/36
2007/0064403 A1* 3/2007 Badarinarayan et al. ..... 361/796
2007/0227639 A1* 10/2007 Cortes ........................... 152/396
2008/0041921 A1* 2/2008 Creehan et al. ............... 228/101
2009/0087681 A1* 4/2009 Decker et al. ................ 428/649
2010/0089976 A1* 4/2010 Szymanski et al. ........... 228/113

* cited by examiner

*Primary Examiner* — Kelly M Gambetta
(74) *Attorney, Agent, or Firm* — Reising Ethington, P.C.

(57) ABSTRACT

The surface composition of a metal article may be modified by depositing a coating layer material of a different composition from a consumable tool which is urged against the article surface while being rotated about an axis generally normal to the surface. The frictional heating resulting from rotation of the tool under applied pressure increases the temperature of the article-contacting portion of the tool so that it adheres to and bonds to the magnesium alloy article. In an embodiment the tool material is selected to be more corrosion-resisting than or sacrificial to the substrate metal alloy. In another embodiment the tool material is selected to react with the magnesium surface to form a more corrosion-resistant coating or a sacrificial layer. In another embodiment a hole-making cutting tool may be incorporated in to the consumable tool to enable fabrication of a hole with a surrounding, more corrosion-resistant annular surface. Further processing of the article with its coating layer may include: buffing, burnishing, or polishing the layer; and heat treatment to promote diffusion of the layer composition into the article composition.

19 Claims, 3 Drawing Sheets

CONSUMABLE TOOL FRICTION STIR PROCESSING OF METAL SURFACES

TECHNICAL FIELD

This invention pertains to enhancing the corrosion protection of metal articles, and particularly magnesium alloy articles, through the deposition of a coating of corrosion-resistant compositions on the surface of the articles. The corrosion-resistant compositions may serve as barrier or sacrificial coatings and may be applied by friction stir processing using a consumable tool to transfer tool material to the surface of the article.

BACKGROUND OF THE INVENTION

A wide variety of automobile components have traditionally been formed from steel alloys and, more recently, from aluminum alloys. In many instances, the corrosion resistance of these components may be bolstered by application of coatings to better ensure product longevity in corrosive environments. The coatings may be barrier coatings, intended to exclude a corrosive environment from the article, or sacrificial coatings, which, on exposure to a corrosive environment, will corrode in preference to the article. These coatings, which may include metal and organic coatings, may be applied using a variety of methods including dipping the article in molten metal baths, metal spray, painting and various electrodeposition processes such as electroplating.

In recent years, magnesium alloys, particularly as castings, have been the subject of considerable investigation and development due to their relatively low density relative to other structural metals. But, such magnesium-based alloys, generally containing 85% by weight or greater of magnesium and alloying elements such as aluminum, zinc, silicon and manganese, among others, are prone to corrode when exposed to water or to aqueous salt solutions. Galvanic corrosion is particularly troublesome when the magnesium alloy is in contact with other, less corrosion-prone alloys, such as the steel and aluminum commonly used in automobiles.

Magnesium alloys are not particularly well suited to many of the coating processes developed to protect steel and aluminum against corrosion and are incompatible with some. For example the phosphating process, intended to deposit a corrosion-resistant phosphate layer on steel will be rendered ineffective after some exposure to magnesium alloys. Hence many of these cast magnesium alloy articles have been used in environments where no exposure to corrosive media is anticipated or any such exposure may be well controlled. Typical applications have included steering column components, instrument panel beams, clutch and brake pedal brackets, transmission cases and housings, among others, A broader range of applications for metals and alloys generally, and for magnesium alloys in particular may be anticipated if their corrosion performance may be improved, for example by application of a surface coating with a more corrosion-resisting or a sacrificial composition. But conventional coating processes have not proven particularly suitable for magnesium alloys and currently-available alternative coating technologies such as spark-anodizing (micro-arcs, plasma electrolytic oxidation, etc) or thermal spray processes have enjoyed only limited success.

What is therefore needed is an efficient and easily-operated technique to modify the surface composition of metal articles and magnesium alloy components in particular to render such components more corrosion-resistant.

SUMMARY OF THE INVENTION

This invention provides a method enhancing the corrosion-resistance of a metal alloy article by depositing a corrosion-resisting coating layer over at least a portion of a surface of the article. The method calls for forming a tool of a corrosion-resisting material and then rotating and pressing the tool against the surface of the article. The pressing and rotating action of the tool will rub the tool across the article surface, heating the tool and promoting transfer of material from the tool to the surface of the article to deposit an adherent corrosion-resisting coating layer on the article surface.

In an embodiment, a native deposit or coating may be formed when the deposited material does not react or alloy with the composition of the metal article beyond strongly bonding to the article. In another embodiment the deposit or coating may react with, alloy with or diffuse into the surface of the metal article to form a derivative layer or deposit whose composition will incorporate contributions from both the workpiece and native deposit. It will be appreciated that depending on the deposition conditions, particularly the deposition temperature, a single metal tool material may form either a native or derivative coating on an article. Also, particularly in complex alloy systems, more than one derivative coating composition may be formed.

The limited number of suitable approaches for enhancing the corrosion resistance of magnesium alloy articles renders the method particularly applicable to such magnesium alloy articles. Suitable magnesium alloy compositions may incorporate magnesium in an amount of 85% by weight or greater in combination with alloying elements such as aluminum, zinc, silicon and manganese with small proportions of common impurities. Exemplary alloys include AZ31 (nominally containing 3 wt. % aluminum, 1 wt. % zinc, balance magnesium), AZ91 (nominally containing 9 wt. % aluminum, 1 wt. % zinc, balance magnesium) and AM60 (nominally containing 6 wt % aluminum, about 0.4 wt % manganese, balance magnesium) among others.

The corrosion-resisting behavior of the coating may arise in two ways. For metallic or alloy layers, the tool material may be selected to be more anodic than the underlying article so that it protects the article by serving as a sacrificial layer and corroding first, in preference to the article. Alternatively the tool material may be selected to be less anodic than the article and protect the article by forming a barrier layer on the article surface and excluding corrosive environments from contact with the article. For highly anodic magnesium alloys, barrier layer coatings are commonly employed.

Tool materials may be metals or alloys. It is intended that the tool material be softer than the article so that the tool material is rubbed off onto the article. Since the tool is at least frictionally heated by rubbing against the article, this transfer of material from the tool to the article occurs at elevated temperature, and may be facilitated by selecting tools with appropriate thermal properties, relative to the thermal properties of the workpiece. Specifically the melting temperature (for a metal tool), or the solidus temperature, the lowest temperature at which an alloy is entirely solid (for an alloy tool) should be less than the solidus temperature of the article, generally less than about 650° C. for magnesium alloys. Suitable tool materials for depositing such a barrier coating on magnesium and its alloys include aluminum, zinc, tin and their alloys, all of which may produce native or derivative deposits.

The tool may be traversed, at a suitable speed, across the entire surface of the article to afford corrosion protection to the entire surface or the coating may be deposited on, or alloyed with, only selected portions of the surface. Selective application of the tool may be preferred where article surfaces will be in local contact with a less reactive metal which might promote galvanic corrosion. In this situation the application of either a native or derivative deposit may forestall or minimize the galvanic corrosion which might otherwise occur.

The friction stir process may employ a generally cylindrically-shaped tool, rotating about its cylindrical axis and terminating in a generally flat or gently-curved workpiece-contacting surface. When such a rotating tool is pressed against a workpiece, the resulting friction between the tool and workpiece in the contact area will generate heat. Suitable tool rotation speeds range from between about 1500 to about 10,000 revolutions per minute (rpm), while pressing forces of between 300 and 500 pounds (force) are preferred.

In practice of this invention, a tool with relatively low heat resistance is employed. As the tool is frictionally heated the tool may soften and become more deformable. Under aggressive processing conditions, such as high tool rotational speeds, leading to high heat generation the tool solidus temperature, or melting temperature, may be exceeded, causing the tool to at least partially melt. The softened or melted tool material may transfer to the workpiece surface and form a native deposit by only bonding to the workpiece or may form a derivative deposit by reacting or alloying with the workpiece surface. The reaction or alloy product may include a low melting point compound or eutectic composition which will melt and become fluid at the processing temperature. The tool composition may be varied depending on the specific composition of the magnesium alloy article. The tool composition may be selected so that the resulting native or derivative coating applied to the workpiece surface has greater corrosion resistance that the unmodified workpiece surface.

In another embodiment of the invention supplementary heat may be provided to the rotating friction stir tool to facilitate transfer of material from the tool to the workpiece.

It will be appreciated that the intent is to selectively heat the tool without heating the workpiece which should be maintained at near ambient temperature. Suitable heating methods may include induction heating, radiant heating or flame heating by combustion of flammable gases. In all cases, the configuration of the heating device may be selected to direct maximum heat to the tool and minimize heat flow to the workpiece. Non-uniform tool heating may be preferred since transfer of material from the tool to the workpiece occurs only where the tool and workpiece are in contact. Thus a suitable heater geometry, and, if required, suitably-positioned heat shields or water cooling jackets or similar apparatus, may be employed to direct heat to the tool-workpiece contact region of the tool and limit application of heat to other portions of the tool.

Application of pressure at the heated and softened end of the tool may make it prone to deform and expand laterally. Hence, it may be preferred to slidably confine all but the article-contacting end of the tool within a close-fitting sheath or hollow casing with an internal cross-sectional shape complementary to the tool cross-section. In this configuration, the tool may be prevented from extensively deforming and mushrooming by the support provided by the casing, but progressively slid or advanced through the casing, under pressure, and into continued engagement with the workpiece as it is consumed.

In a further embodiment the low thermal resistance tool may be modified to incorporate a smaller diameter drill bit or other rotating metal removal and hole-making tool such as an end-mill. The rotation axis of the hole-making cutting tool may be coincident with the rotation axis of the tool. The smaller diameter cutting tool may protrude from the larger diameter low thermal resistance cylindrical friction stir tool, so that the combination friction stir tool has the general form of a stepped cylinder. The step, or shoulder, is the workpiece-contacting surface of the low thermal resistance tool.

When this tool is advanced into the workpiece, the protruding cutting tool will contact the workpiece surface first. On continued advancement the cutting tool will cut a cylindrical hole into the workpiece and further tool advancement will enable contact between the tool shoulder and the workpiece surface and transfer tool material to an annular region surrounding the cavity. It will be appreciated that for chip removal the cutting tool should protrude from the low thermal resistance cylinder a distance greater than the workpiece thickness so that a through-hole may be formed before the shoulder contacts the workpiece.

Such a workpiece configuration, an uncoated cylindrical cavity surrounded by a surface-coated annular region, may enable the use of mechanical fasteners, such as steel bolts, without requiring the use of an insulating washer under the head of the bolt. If the maximum diameter of the annular region exceeds the maximum bolt head dimension, the underside of the steel bolt head, will contact the less corrosion-prone coated annulus and galvanic corrosion may be inhibited.

In the case of a through-bolt, the cylindrical hole cut by the tool may be sized to accept the bolt shank and the bolt secured with a nut. Of course since the annular region will be formed only on the bolt-head side of the workpiece a corrosion-resistant washer may be required under the nut if that side of the bolt hole is also exposed to a corrosive environment.

In thicker workpieces the through-hole may be threaded if the underside of the workpiece is not exposed to a corrosive environment. Again the underside of the bolt head will be supported by the surrounding annular coated surface region of the workpiece.

If required, the article with its native or derivative layer may be processed further. For example the layer surface may be burnished or polished to present a more pleasing aspect or to size the article to a preferred dimension. Alternatively, or additionally, the article may be heat treated to promote or enhance diffusion and interaction between the deposited tool material and the article composition to render a derivative coating from a native coating or an alternate derivative coating from a previously-formed derivative coating.

DESCRIPTION OF PREFERRED EMBODIMENTS

The following description of the embodiment(s) is merely exemplary in nature and is not intended to limit the invention, its application, or uses.

Material may be deposited on the surface of an article using a friction stir process in which a rotating tool is pressed against a workpiece to generate frictional heat. The tool material may be selected to inhibit corrosion of the article on which it is deposited. The tool is consumable and will often be selected to be of a lower melting point (if pure) or of a lower solidus temperature (if an alloy) material than the melting point or solidus temperature of the article whose surface composition is to be modified. Heat will be generated by the rotating action of the tool, and some portion of the tool, urged by the pressing and the rotating action of the tool will transfer to and bond with the surface of the article to form a coating of the tool material. Such a coating is termed a native layer. The layer may be more anodic than the article and corrode preferentially to provide sacrificial protection, or be less anodic than the article and serve as a barrier layer, denying the corrosive medium access to the article.

The procedure has particular application to magnesium alloy articles, where it may be employed to deposit a more corrosion resistant barrier layer or even a sacrificial surface layer on the magnesium alloy. However, since only a few metals are more anodic than magnesium and its alloys, barrier coatings are more common. In an embodiment of the method it is intended that the tool composition be selected to be more corrosion-resistant than the magnesium article and form a native layer. In another embodiment the tool material may be selected to react with the magnesium alloy, or diffuse into the magnesium alloy. Such a layer is termed a derivative layer and is likewise intended to convey corrosion protection to the article. Suitable tool materials may include aluminum, zinc, tin and their alloys.

Figure 1:
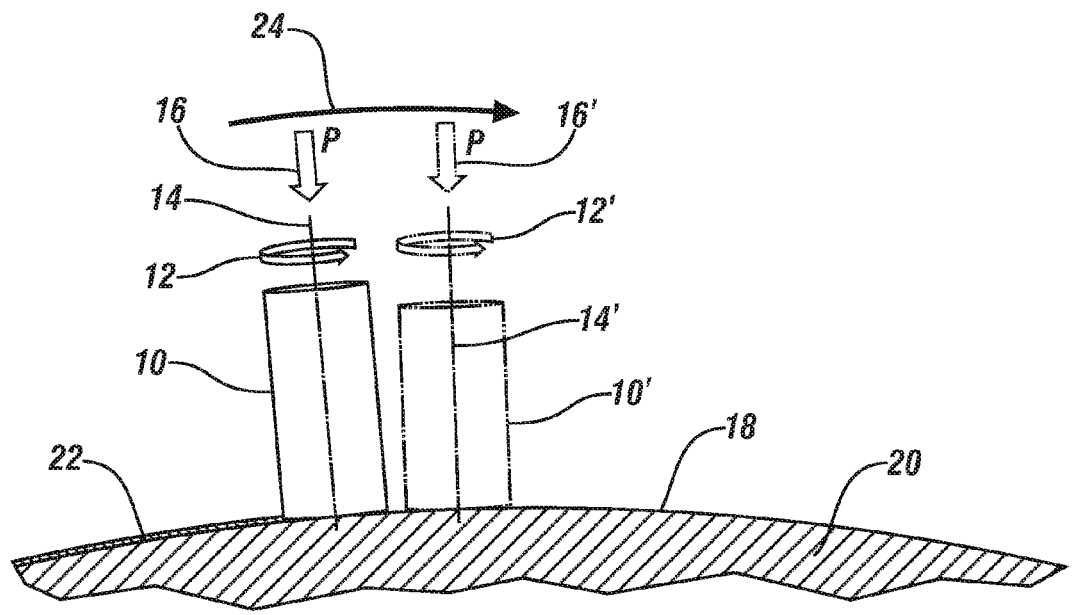
FIG. 1 shows, in cross-section, a surface being contacted by a consumable friction stir tool for transfer of tool material from the tool to the workpiece.

FIG. 1 illustrates a cylindrical tool 10, oriented substantially normal to surface 18 of magnesium article 20, rotating about its centerline 14 in a direction indicated by arrow 12 and. Tool 10 is pressed, under the influence of load P, applied in the direction of arrow 16, generally aligned with the local normal to the surface of article 20 against surface 18 of magnesium article 20 supported by an anvil or other suitable support structure (not shown). As a result of the frictional heating some of the material of tool 10 is deposited on the surface of magnesium article 20 as deposited layer 22. Deposited layer 22 may be up to about 100 micrometers thick but appreciably thinner coatings of about 5 micrometers or so may also be laid down. Lateral motion, for example along the direction indicated by arrow 24, and re-orientation of the tool to re-enable general alignment with the surface normal, will enable continued deposit of tool material. One suitable resultant tool configuration is shown in ghost and indicated as 10', shorter than tool 10 due to further addition of tool material to deposited layer 22. Tool 10' may rotate about centerline 14' in direction of arrow 12' and be urged against workpiece surface 18 by load P directed as shown by arrow 16'.

Deposited layer 22, which derives primarily from tool 10 may also incorporate fragments of any naturally-occurring oxide layer(s) which may be present on either tool 10 or workpiece 20 as well as some contribution of material from workpiece 20. Often however the deposited layer will be a native layer and workpiece material will be present only in quantities sufficient to form a robust bond between the workpiece material and the tool material at their interface.

Suitable magnesium alloys for practice of the invention include those alloys commonly available as wrought, primarily sheet, products and those available as cast, often die cast, products. These alloys will typically contain 85% by weight or more of magnesium in combination with one or more alloying elements including aluminum, zinc, silicon and manganese, in quantities of up to 10% by weight of each element with small quantities of impurity elements. Exemplary alloys include AZ31, AZ91 and AM 60, among others.

The tool material and process conditions may also be selected to alloy with the magnesium. This is most readily effected by employing a tool material which, when alloyed with magnesium, forms a lower melting point composition than the tool composition alone, and by operating the process at elevated temperature. The elevated temperature may result from aggressive process conditions, for example very high tool rotational speeds of 10,000 rpm or more or by external heating of the tool. Under these conditions, as the tool material interacts with the magnesium alloy article, the lower inciting point composition formed will melt and form a molten layer between tool and workpiece. The molten layer will encourage diffusion and continued alloying and thereby assist in developing a derivative laid-down coating of generally uniform composition as the tool traverses the workpiece.

Suitable tool compositions include aluminum zinc and tin or their alloys, all of which form a low melting point eutectic composition and/or a low melting point compound.

Figure 2:
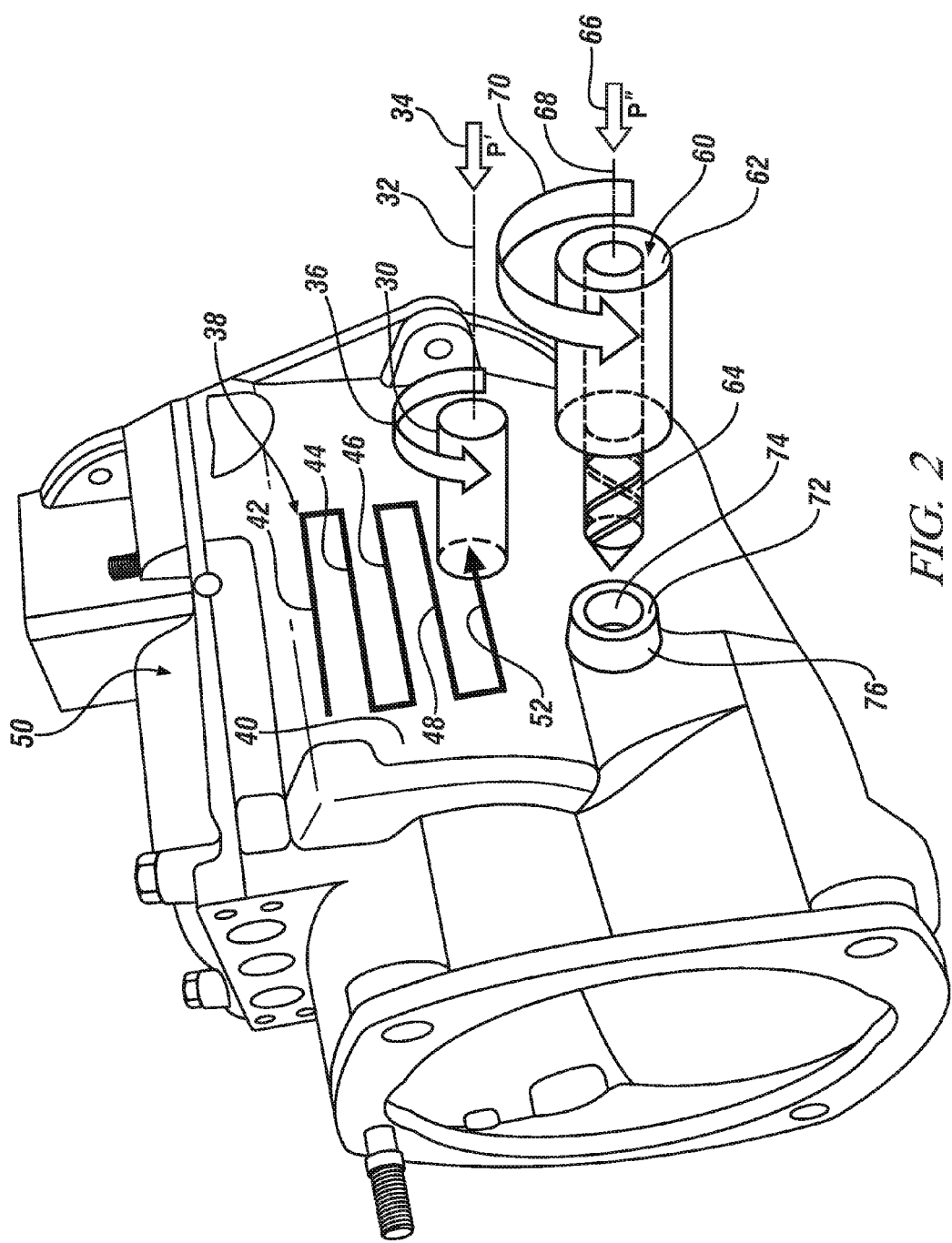
FIG. 2 is a perspective, schematic illustration of a gear case for an automobile showing a first friction stir tool for deposition of tool material over some portion of the case surface and a second friction stir tool, incorporating a cutting tool for preparing a hole and coating the surrounding area.

FIG. 2 shows a potential magnesium alloy application, a transfer case 50 for a four-wheel drive vehicle and incorporating generally planar surface 40 and a raised boss 76. FIG. 2 further illustrates the application of two friction stir tool embodiments of the invention to such a magnesium alloy article. Tool 30, substantially identical to the tool shown in FIG. 1, is pressed against surface 40 of transfer case 50 by a load P' directed in the direction of arrow 34 as tool 30 is rotated about centerline 32 in the direction of arrow 36. Tool 30 traverses path 38 and is so sized that the width of material deposited by tool 30 during passage along any of legs 42, 44, 46, 48 and 52 of path 38 will extend to the deposit made during passage along a neighboring leg. That is the edges of the width of tool material laid-down during passage of the tool along leg 46 will extend to at least minimally overlap the edges of material laid-down by tool 30 during its passage along legs 44 and 48.

Also shown in FIG. 2 is tool 60 which has a body 62 of low thermal resistance material in the form of a hollow cylinder surrounding and generally coaxial with a cutting tool 64, here represented, without limitation, as a drill bit. Cutting tool 60 is urged against transfer case 50 by application of load P''' directed along arrow 66 and is rotating about centerline 68 in a direction indicated by arrow 70.

Tool 60 is particularly suited for cutting hole 74 in boss 76 while depositing a corrosion-resisting coating on boss surface 72. When first advanced against transfer case 50, the end of tool 64 will engage boss 76 which may or may not incorporate a cast-in hole. On continued advance tool 64 will cut and/or size hole 74, and break through the case wall before tool shoulder 78 engages boss surface 72. Yet further advance of tool 60 will result in rubbing contact between tool shoulder 78 and boss surface 72 resulting in transfer, and possible alloying of the tool (shoulder) material 62 to the boss surface, analogous to that resulting from interaction of tool 30 with surface 40.

Figure 3:
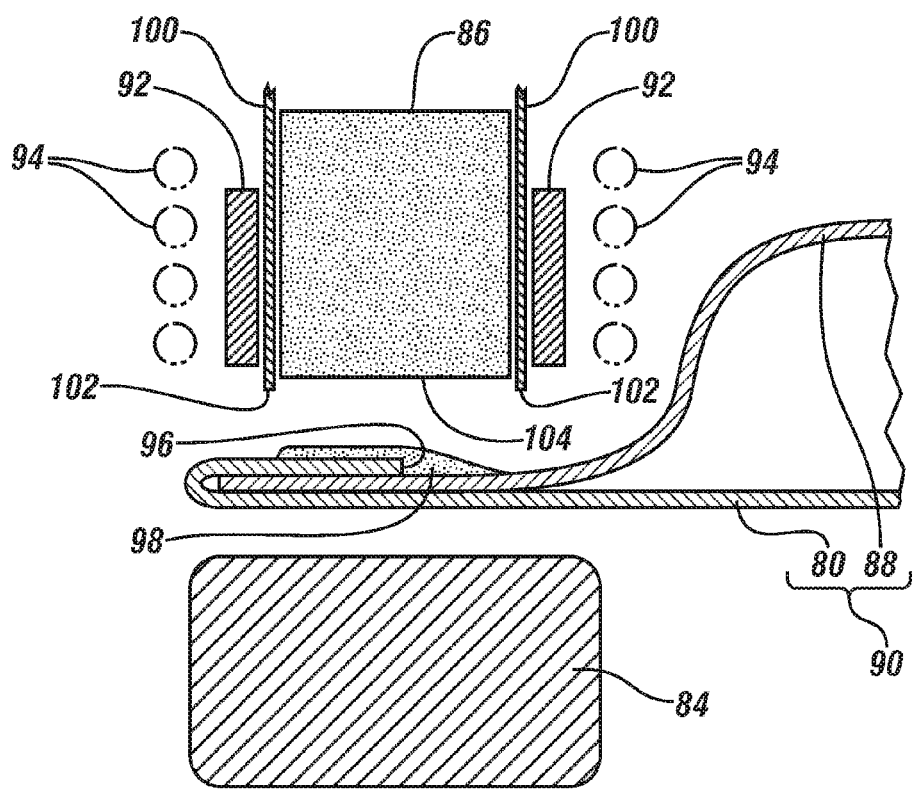
FIG. 3 is a cross-sectional view of a heated tool for coating of a hemmed sheet metal part, illustrating the use of a radiant heater or an induction coil for heating the tool.

FIG. 3 illustrates a third embodiment of the invention. A workpiece 90 consisting of a flanged joint fabricated from two thin sheets, outer panel 80 and inner panel 88 is shown positioned between anvil 84 and friction stir coating tool 86. As before it is intended that tool 86 be rotated about its centerline (not shown) and urged against workpiece 90 by application of a load directed toward supporting anvil 84. In this embodiment tool 86 is slidably contained within close-fitting casing 100, an elongated thin-walled metal sheath, open on both ends, with an interior opening complementary in shape and size to the exterior surface of tool 86. For example if tool 86 is cylindrical then casing 100 may be a hollow cylinder with an interior diameter slightly greater than the diameter of the tool cylinder so that the tool may readily be inserted on one end and then slid the length of the casing to engage the workpiece. End 102 of casing 100 may be maintained at a generally small preset distance, say 1-2 millimeters, from workpiece 90 as tool 86 is urged into contact with the workpiece. By so doing, casing 100 may control or limit any upsetting of workpiece-contacting end 104 of tool 86 and thereby limit any tendency of tool end 104 to laterally expand or mushroom during processing as tool 8 is urged into contact with the workpiece.

Workpiece 90 may, for example, be a door hem in which outer panel 80 is an aluminum alloy and inner panel 88 is a magnesium alloy sheet or a thin-wall magnesium die casting. This material combination, if exposed to moisture or aqueous road salt solution may result in galvanic corrosion of the magnesium alloy. This potential for corrosion may be reduced if tool material 98 from tool 86 is applied to overlap the edge 96 of the hem flange formed in outer panel 80. Deposited tool material 98 may also extend some lateral distance on either side of edge 96 so that it overlies portions of inner panel 88 and outer panel 80. With appropriate choice of tool material to reduce the corrosion potential between the magnesium alloy and tool overlay 98 galvanic corrosion of magnesium alloy inner panel 88 may be minimized. Similarly by distancing the magnesium from the aluminum the opportunity for magnesium-aluminum galvanic action may also be reduced.

Selective heating of tool 86, particularly the workpiece-contacting surface of tool 86 may be employed to encourage transfer of material from tool 86 and its deposition on a workpiece surface. Numerous heating methods including flame heating and infrared heat lamps may be used but FIG. 3 includes representations of two methods for selectively heating tool 86. One method is to use an electrically-heated sleeve 92 which closely conforms to the diameter of rotating cylindrical tool 86 and enables radiant heating of tool 86. An alternative method is induction heating by passing a high frequency alternating electric current through (water-cooled) coil 94, shown in ghost. Although depicted as distanced from tool 86 for clarity it is preferred that, like heated sleeve 92, coil 94 will be closely spaced to tool 86. By appropriate choice of coil configuration and frequency, a suitable coupling between tool and coil may be obtained to achieve a desired temperature profile.

It will be appreciated that material is to be transferred only from that portion of the tool which contacts the workpiece so that heating may be limited to only the workpiece-contacting region of the tool. Such localized heating may be accomplished by controlling the heater geometry, for example by varying the coil-to-coil spacing and placement in the case of induction coil 90. Alternatively, insulating, reflecting or watercooled heat shields (not shown) may be selectively interposed between the heater and tool to promote the desired temperature profile.

Such heating may be employed for all tool materials but may be most useful when the tool material has a solidus temperature or a melting point comparable to or higher than the solidus temperature or melting point of the workpiece. In general the strength of metals and alloys depends on their homologous temperature, that is, the ratio of the actual temperature to their solidus temperature, both expressed in Kelvin. High solidus temperature alloys will therefore retain their strength to higher measured temperatures than low solidus temperature materials.

For deposition of tool material on the workpiece, the workpiece-contacting portion of the tool should be sufficiently soft that material may be abraded or otherwise removed from the tool by contact with a harder workpiece. So, if the tool is a higher-melting metal or higher solidus temperature alloy than the workpiece then, if both are held at the same temperature, the tool may be harder than the workpiece and tool deposition will not occur. Selectively heating the tool, and more particularly the workpiece-contacting portion of the tool, may enable deposition of tool materials of higher solidus temperature than the magnesium alloy workpiece.

As an exemplary, non-limiting example of such a process, a tin coating was locally applied to an AZ31(nominally 3 wt % aluminum, 1 wt % zinc) magnesium sheet alloy article. One end of a commercially-pure tin cylindrical rod rotating about its cylinder axis at 3000 rpm is brought into contact with the AZ31 article surface, and held, in contact with the surface but under minimal load, for about 45 seconds. The rod is then incrementally advanced in stepwise manner into the AZ1 article surface by application of a load applied along the cylinder axis. This is continued until the applied load increases to about 380 pounds (force), when the tool is retracted and disengaged from the surface.

Figure 4:
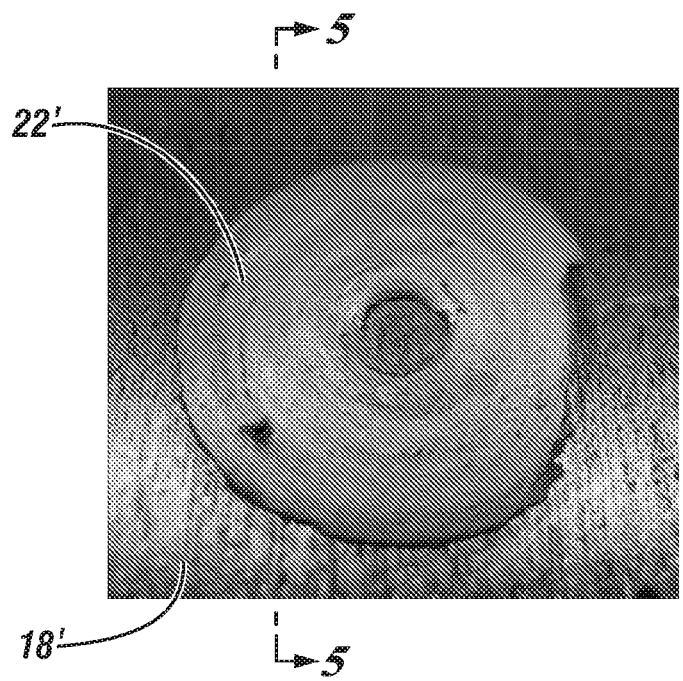
FIG. 4 shows, in generally plan view a tin-containing patch deposited on the surface of an AZ31 sheet magnesium alloy by practice of the invention.
Figure 5:
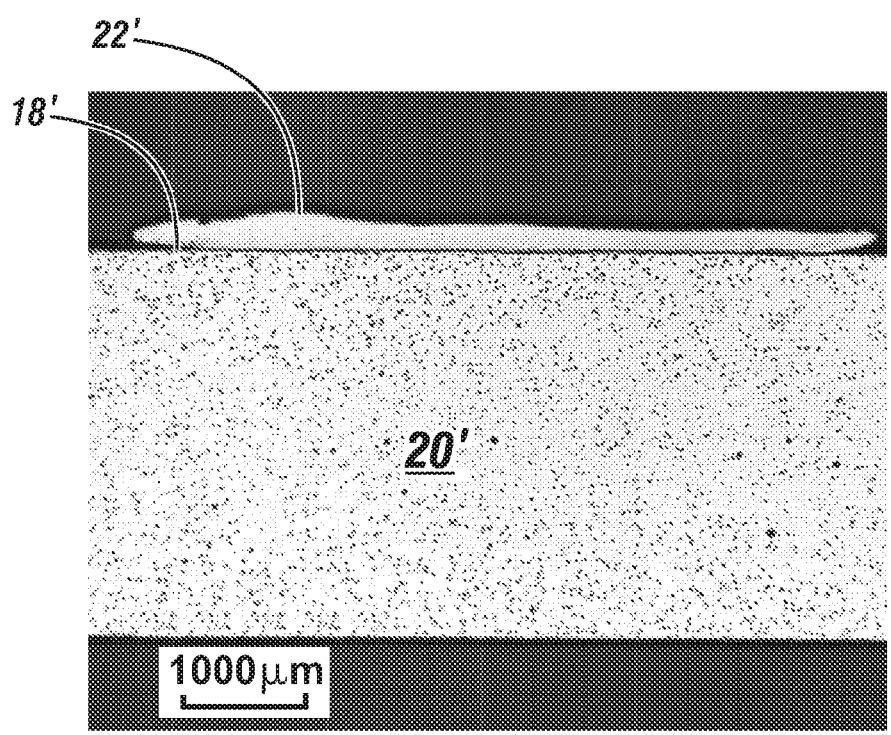
FIG. 5 shows, in sectional view, the tin-containing patch on the AZ31 alloy sheet of FIG. 4 after polishing to metallurgical flatness.

FIG. 4 shows, in generally plan view, native deposit 22' laid down on surface 18' of the AZ31 sheet 20' (FIG. 5) after applying the above procedure while FIG. 5 shows a sectional view of native deposit 22' and workpiece 20' obtained after polishing to metallurgical flatness. Deposit 22' is of generally uniform thickness and about 100 micrometers thick.

The processing parameters used in the above example are intended to be illustrative and not limiting. For example it is expected that some benefit might result from using a higher rotational speed to increase the rate of heat generation. Workpiece 20' with its adherent native deposit 22' may be further processed to enhance its characteristics. Further processing steps could include polishing, buffing or burnishing deposit 22' to present a more pleasing aspect or to control the dimensions of now-coated article 20'. Alternatively, article 20' may be heated to a suitable temperature to promote diffusion so that native deposit 22' may react with article 20' and be transformed into a derivative deposit. In complex alloy systems a deposited derivative deposit may be transformed, by subsequent heat treatment into an alternate derivative deposit.

While preferred embodiments of the invention have been described as illustrations, these illustrations are not intended to limit the scope of the invention.

The invention claimed is:

1. A method of enhancing the corrosion-resistance of a metal alloy article comprising a first metal alloy member with a surface and a second metal alloy member with a surface and of dissimilar composition, the first and second members being in contact along a previously-formed joint and thereby forming on the article, in the presence of moisture or aqueous road salt solution, a galvanic corrosion-susceptible location comprising the formed joint and joint-abutting portions of the surfaces of each of the alloy members, the method comprising:

applying an adherent corrosion resisting metal coating layer to the article, the coating being adapted to exclude the moisture or aqueous road salt solution from contact with the article surface, the coating layer being applied to at least the corrosion susceptible location by rotating a consumable tool of a corrosion-resisting material, compatible with each of the metal alloy compositions of the metal members while applying a force to press the tool against the surface of the article; and thereby transferring material from the tool to the surface of the article to deposit on the surface of the article at the corrosion-susceptible location the transferred portion of the consumable tool as the adherent, corrosion-resisting coating layer adapted to exclude moisture or an aqueous road salt solution from contact with the article.

2. The method of enhancing the corrosion-resistance of the metal alloy article of claim 1, in which the tool is generally cylindrical with a cylindrical axis and two ends and the tool is slidably contained within an independently-supported, close-fitting hollow cylindrical casing with two ends, and the article-contacting end of the tool extends a distance of between about 1 and 2 millimeters beyond an end of the cylindrical casing, and the tool is rotated about its cylindrical axis while one end is pressed against the surface of the article with a pressing force of between 300 and 500 pounds (force).

3. The method of enhancing the corrosion-resistance of the metal alloy article of claim 2, in which the tool is rotated about its cylindrical axis at between about 1500 and 10,000 rpm.

4. The method of enhancing the corrosion-resistance of the metal alloy article of claim 1, in which the thickness of the corrosion resisting metal coating layer is between 5 and 100 micrometers.

5. The method of enhancing the corrosion-resistance of the metal alloy article of claim 1, in which the corrosion-resisting tool has a composition, and the corrosion-resisting coating layer has a composition, and the composition of the corrosion resisting metal coating layer is substantially the composition of the tool.

6. The method of enhancing the corrosion-resistance of the metal alloy article of claim 5, in which the composition of the corrosion resisting metal coating layer comprises the composition of the first or second metal alloy members and the composition of the tool.

7. The method of enhancing the corrosion-resistance of the metal alloy article of claim 1, further comprising externally heating the tool.

8. The method of enhancing the corrosion-resistance of the metal alloy article of claim 7, in which the tool is heated by one of the group consisting of flame heating, induction heating or radiant heating.

9. The method of enhancing the corrosion-resistance of the metal alloy article of claim 1, further comprising traversing the tool across at least the galvanic corrosion-susceptible location.

10. The method of enhancing the corrosion-resistance of the metal alloy article of claim 1, in which the melting point or solidus temperature of the tool is less than the solidus temperature of either metal alloy member.

11. The method of enhancing the corrosion-resistance of the metal alloy article of claim 1, in which one of the metal alloy members comprises a magnesium alloy comprising at least 85% by weight of magnesium and the second metal alloy member is an aluminum alloy.

12. The method of enhancing the corrosion-resistance of the metal alloy article of claim 11, in which the magnesium alloy is one of the group consisting of AZ31, AZ91 and AM60.

13. The method of enhancing the corrosion-resistance of the metal alloy article of claim 11, in which the tool composition is one of the group consisting of aluminum, zinc, tin and their alloys.

14. The method of enhancing the corrosion-resistance of the metal alloy article of claim 1, further comprising polishing, buffing or burnishing the coating layer.

15. The method of enhancing the corrosion-resistance of the metal alloy article of claim 1, further comprising heating the article and its corrosion resisting metal coating layer to a suitable temperature for a suitable time to enable diffusion of the corrosion resisting metal coating layer composition into at least one of the metal alloy member compositions.

16. A method of enhancing the corrosion-resistance of a magnesium alloy article comprising at least 85% by weight of magnesium by depositing a corrosion-resisting metal coating layer over at least a portion of a surface of the article, the method comprising:

rotating, at between 1,500 and 10,000 revolutions per minute, a tool, heated by one of the group consisting of flame heating, induction heating or radiant heating, the tool comprising a corrosion-resisting material for application to the surface of the magnesium alloy article, the tool being generally cylindrical with two ends, the tool being slidably contained within an independently-supported, close-fitting hollow cylindrical casing with two ends, and the article-contacting end of the tool extending a distance of between about 1 and 2 millimeters beyond an end of the cylindrical casing, while applying a force to press the tool against the surface of the article, where the corrosion-resisting material is one of the group consisting of aluminum, zinc, tin and their alloys; and thereby transferring material from the tool to the surface of the article to deposit on the surface of the article an adherent, corrosion-resisting coating layer of between 5 and 100 micrometers in thickness.

17. A method of protecting a magnesium alloy article from galvanic corrosion by depositing an annular, corrosion-resisting metal coating layer over a portion of a surface of the article which may be contacted by a head of a steel fastener, the corrosion resisting layer being sufficiently extensive to prevent contact of the head of the steel fastener with the surface of the magnesium alloy article, the method comprising:

forming a hole in the magnesium alloy article to receive the fastener, the hole having a circumference; and rotating a tool comprising a substantially cylindrical shell of corrosion-resisting material, compatible with the composition of the magnesium article, while engaging the surface of the magnesium alloy article with the tool and applying a force to press the tool against the surface of the article, thereby transferring material from the corrosion-resisting shell to the surface of the article around the hole to deposit on the surface of the article the annular, adherent, corrosion-resisting coating layer, sized and positioned to extend outwardly from the hole circumference by a distance sufficient to prevent contact between the head of the steel fastener and the surface of the article when the fastener is inserted in the article.

18. The method of protecting a magnesium alloy article from galvanic corrosion recited in claim 17 in which the steps of making the hole and depositing the layer are accomplished using a single tool comprising a rotatable hole-making cutting tool with cutting edges engaging the substantially cylindrical shell of corrosion-resisting material and with its cutting edges extending beyond the shell, the shell being disposed substantially concentrically around the cutting tool enabling rotation of the shell to be effected by rotation of the cutting tool.

19. The method of protecting a magnesium alloy article from galvanic corrosion recited in claim 17 in which the shell consists of one of aluminum, zinc, tin and their alloys.

* * * * *